Aug. 25, 1970 R. J. HOLTON 3,525,129
FASTENERS
Original Filed Feb. 14, 1963
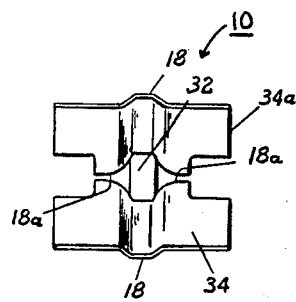
Fig. 1
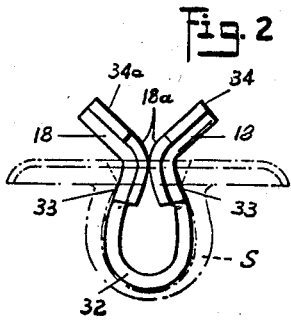
Fig. 2
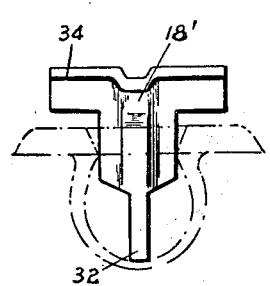
Fig. 3
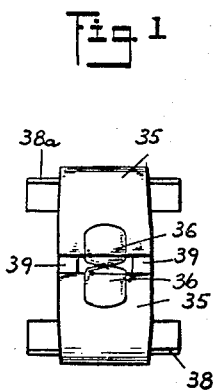
Fig. 4
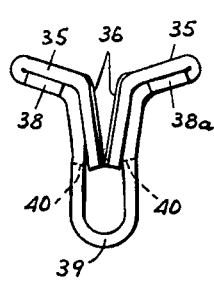
Fig. 5
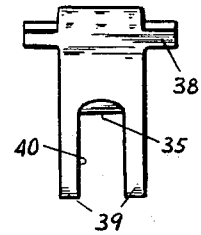
Fig. 6
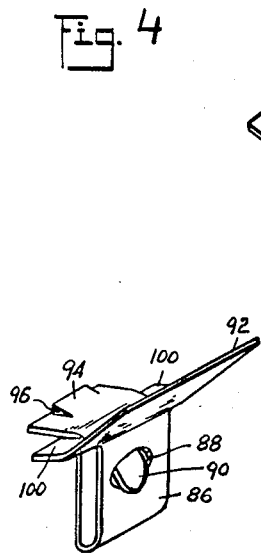
Fig. 7
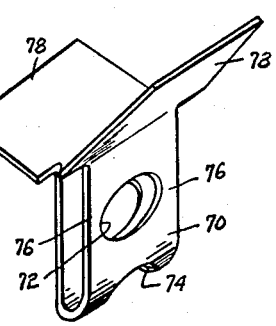
Fig. 8
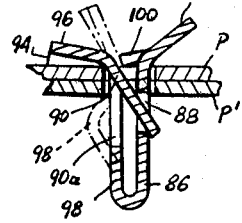
Fig. 9
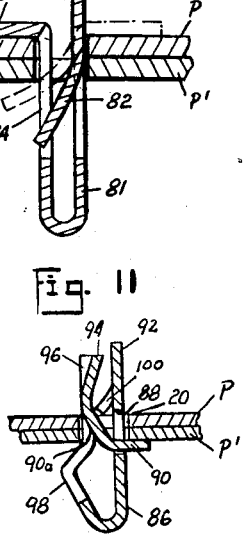
Fig. 10
Fig. 11
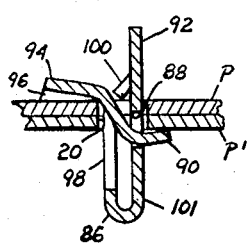
Fig. 12
INVENTOR.
ROBERT J. HOLTON
BY Teare, Teare & Sammon
ATTORNEYS

United States Patent Office 3,525,129
Patented Aug. 25, 1970

3,525,129
FASTENERS
Robert J. Holton, Rocky River, Ohio, assignor, by mesne assignments, to Tinnerman Products, Inc. (Tinnerman II), a corporation of Ohio
Application May 31, 1966, Ser. No. 554,069, now Patent No. 3,459,094, which is a division of application Ser. No. 425,124, Jan. 13, 1965, now Patent No. 3,303,542, which, in turn, is a division of application Ser. No. 258,494, Feb. 14, 1963, now Patent No. 3,208,122. Divided and this application Feb. 14, 1969, Ser. No. 799,377
Int. Cl. F16b 19/00
U.S. Cl. 24—73                    14 Claims

ABSTRACT OF THE DISCLOSURE

A fastener for insertion in an opening in a support member. The fastener comprises a generally vertically oriented loop-like body portion, a pair of tab portions projecting upwardly from the body portion, fulcrum areas disposed adjacent the juncture of the body portion with the tab portions and resilient legs extending upwardly from the body portion and disposed transversely thereof. Upon pivotal movement of the tab portions relative to one another, the body portion is deformed into locking engagement with the support member.

---

This invention relates in general to fastening means and more particularly to malleable, deformable fasteners for securing two or more members together, such as a pair of supporting panels, or for the securing of a molding or the like to one or more panels. This application is a division of the pending application of Robert J. Holton, Ser. No. 554,069, filed May 31, 1966, now Pat No. 3,459,-094, which is a division of application Ser. No. 425,124, filed Jan. 13, 1965, now Pat. No. 3,303,542, which is a division of application Ser. No. 258,494, filed Feb. 14, 1963, now Pat. No. 3,208,122, all to Robert J. Holton.

The fastener means of the instant invention is adapted to be used in place of sheet metal screws, or nut and bolts, and may be expeditiously and readily applied to a panel, and secured thereto, and will effectively couple together the two or more members, which are to be attached.

Accordingly, it is an object of the instant invention to provide a deformable fastener, which may be readily inserted through aligned openings in two or more members, or through an opening in any one of the members, and deformed to a holding position, for securely attaching the members together.

Another object of the instant invention is to provide various forms of fasteners for tying or fastening together a pair of members, such as a pair of superimposed panels, and wherein the fastener comprises a comparatively small, inexpensive member of malleable sheet metal, which fastener is adapted to extend through apertures in the panel members, and to be deformed when in such aperture, into secure engagement with the panel members.

Another object of the instant invention is to provide a malleable sheet metal fastener, adapted to secure a pair of members together, such as for instance, a pair of panel members having aligned apertures therein, and wherein the fastener comprises a loop-like body portion, adapted to extend through the apertured panels, and a pair of tab portions connected to the body portion and projecting therefrom, and wherein the fastener is adapted to be deformed upon relative movement between the tab portions, such movement causing deformation of the body portion, for securing the fastener to the panel members.

A more specific object of the instant invention is to provide a fastener of the character described wherein the tab portions extend outwardly from one another and wherein there is provided fulcrum means on the fastener adapted for coaction upon movement of the tab portions toward one another, to facilitate deformation of the loop-like body portion into secured relation on the supporting members.

Other objects and advantages of the invention will be apparent from the following description taken in conjunction with the accompanying drawings wherein:

FIG. 1 is a top plan view of a fastener constructed in accordance with the instant invention;

FIG. 2 is an end elevational view of the fastener illustrated in FIG. 1, and showing in phantom lines a resilient cap-like sealing member assembled therewith for sealing the receiving aperture in a panel;

FIG. 3 is a side elevational view of the fastener illustrated in FIGS. 1 and 2, and further showing in phantom lines the resilient sealing member mounted thereon;

FIG. 4 is a top plan view of a modification of the fastener;

FIG. 5 is an end elevational view of the fastener of FIG. 4;

FIG. 6 is a side elevational view of the fastener of FIGS. 4 and 5;

FIG. 7 is a generally perspective view of a further modification of the fastener;

FIG. 8 is a sectioned elevational view showing a further modification of the fastener as mounted on a pair of apertured panels; in phantom lines there is illustrated the deformed position of the fastener for securing the panels together;

FIG. 9 is a generally perspective view of a still further modification of the fastener;

FIG. 10 is a sectional view of the fastener of FIG. 9 as mounted in the aperture of a panel, and ready for deformation into secured position on the panel; the phantom lines illustrating this deformed position;

FIG. 11 is a sectional view of the fastener of FIG. 9 utilizing an alternate method of installing the fastener for securement to a panel or panels, and illustrating the position of the fastener after it has been deformed into secured relation on the panel; and FIG. 12 is a sectional view of the fastener of FIG. 9 as mounted in the apertures in the panels, and illustrating another alternate method for installing the fastener with the panels, and illustrates the deformed position of the fastener in secured relation on the panel.

Referring now again to the drawings and in particular to FIGS. 1 to 3 thereof, there is shown a fastener or clip 10 comprising a generally vertically oriented, loop-like body portion 32, having outwardly divergent, generally T-shaped sections defining tabs 34 and 34a for readily actuating the fastener to deform the loop-like body portion 32 into secured relationship on an apertured support panel or the like. The fastener 10 may be formed from a single piece of deformable, malleable material, such as for instance sheet metal, and for example cold rolled steel. Such malleable metal possesses the characteristics that it may be generally permanently deformed upon application of a predetermined force, as distinguished from a purely spring-type metal which when bent will generally return to its orignal position upon removal of the bending or distorting force.

The clips of the present invention may be formed from blanks having outlines of paired, generally T-shaped configurations connected together by the loop-like body portion 32 which is of a reduced transverse width compared to the transverse width of the tabs 34 and 34a. As can best be seen in FIGS. 1 and 2, the generally angular T-shaped sections of the clip are preferably deformed or embossed outwardly, as at 18, to add strength to the clips in that area, and also to provide confronting fulcrum portions 18a (FIG. 2) adapted for engagement against one another upon movement of the tabs 34 and 34a toward one another to deform or collapse the loop-like body portion 32 into secured relation with a panel.

In FIGS. 1 and 2 it can be seen that the loop-like body portion 32 is of a substantially lesser width as compared to the width of the generally T-shaped portions of the clip, and of a lesser width than even the embossed ribs 18 formed by deformation of the T-shaped sections of the clip. Accordingly, upon application of inward pressure on the tabs 34 and 34a, as for instance by a pair of pliers operated by a workman, the confronting fulcrum portions 18a engage one another upon pivoting of the tabs 34 and 34a toward one another to cause spreading deformation of the loop-like body portion 32 into secured relationship with a panel or panels.

In this form, loop-like body portion 32 of the clip 10 is of a generally elliptical or arcuate configuration, in elevation, adapted for holding coaction with a resilient, cap-like member S, which is constructed and arranged to receive the loop-like body portion 32 of the clip in the interior of the resilient cap, and to coact therewith, as at 33, in maintaining such resilient sealing member in assembled condition with the fastener. Reference may be had to U.S. Pat. Nos. 2,924,864 and 2,995,790, issued Feb. 16, 1960, and Aug. 15, 1961, respectively to Robert J. Holton, for a more detailed description of the resilient sealing members which may be utilized with the clip. During deformation of the clip caused by movement of the tabs 34 and 34a toward one another, the loop-like body portion 32 is deformed and thereby also deforming the resilient sealing member S and urging it into positive sealing relation, in the aperture provided in the panel, thus preventing the entry or movement through the aperture of moisture, dust, foreign matter or the like. It will be noted that in FIGS. 1 to 3, the embossed ribs 18 extend fully to the uppermost extremity of the tabs 34 and 34a and do not terminate short of such extremities.

The openings or apertures in the panels, as at P and P' (FIG. 8), through which the fastener or clip extends may be of any desired configuration but are preferably of a generally circular configuration, which is usually the most economical type of opening to provide, and the fastener is initially easily received through such aperture preparatory to deforming the same into secured position on a panel. The laterally projecting T-shaped sections defining the tabs 34 and 34a are adapted to engage the uppermost surface of the panel, and the collapsing of the loop-like body portion 32 causes the embossments of ribs 18 to cam against the defining boundary of the aperture on the opposite or under side of the panel, thereby to urge the panels together when two or more of the panels are disposed in superimposed relationship. It will be noted that substantially all deformation of the clip or fastener occurs in the loop-like body portion 32. Once the fastener is deformed into its secured relation on a panel or panels, the loop-like body portion 32, which has been deformed into a more or less linear configuration, acts as a beam extending between the T-shaped sections defining the tabs 34 and 34a and thus assures that the fastener is maintained in secured relation on the panels to positively secure them together. It will be seen therefore, that such clip or fastener arrangement can readily be utilized for attaching panels of various thicknesses together.

The fastener of FIGS. 4, 5 and 6 includes return bent end portions 35 which are bent back against the respective T-shaped section of the fastener, and are provided with inwardly facing embossments 36, which coact with one another as fulfcrums upon predetermined movement of the winged tabs 38, 38a toward one another. It will be seen that the body portion in this instance is formed by severing out, as at 40, the central section of the loop-like body portion. As best shown in FIGS. 5 and 6, it is preferable that the return bent ends 35 extend below the uppermost extremity of the respective aperture 40 defined between the deformable strap portions 39 of the fastener. This increases the deformability or collapsibility of the body section, making it easier to secure the fastener onto a supporting panel or part.

FIG. 7 discloses a further embodiment of the fastener wherein the body section 70 of the fastener is provided with a predetermined size of apertures 72 therethrough, and also is beveled or recessed outwardly as at 74, to separate and weaken the side walls of the U-shaped body portion of the fastener, to thereby greatly facilitate the outward collapsing of the loop along the bend areas 76 upon movement of the head tabs 78 toward one another. As can be readily seen the fastener of FIG. 7 is extremely simplified, and readily lends itself to mass production procedures.

FIG. 8 discloses a fastener wherein the head tabs 80, 80a which may be of the exterior configuration of those of FIG. 7, are disposed angularly with respect to one another, one extending generally vertical while the outer (80) is extending in more of a horizontal or longitudinal direction, and wherein the body section 81 is partially severed to provide an inwardly projecting tongue 82 on one side thereof, and the body section is apertured or severed to provide an opening 84 on the other side thereof, in confronting relationship with the tongue and receives the tongue therein so that the fastener as shown can be generally inserted into apertures in a pair of supporting panels P, P'. Upon deformation of the vertical tab 80a, this causes the deformation of the tongue upwardly to the phantom lines position illustrated, thereby locking the fastener to the underside of the supporting panel P'.

FIGS. 9 and 10 disclose a generally U-shaped fastener wherein one side of the fastener body section 86 is provided with an aperture 88 therein and receives a tongue 90 partially severed as at 90a from the other side of the fastener. One, 92 of the head tabs of the fastener is preferably generally obliquely disposed, as shown, and the other, 94 of the tabs is deformed upwardly preferably centrally thereof, as at 96, so that it can be readily grasped with a pair of pliers or other like tool in the deformation of such tab 94 toward the other tab 92. The tongue 90 acts as an anchor and upon upward movement of the tab 94 toward the other tab 92 collapsing of the weaker side 98 of the fastener into the generally phantom line position illustrated occurs, thereby causing deformation of the body portion of the fastener and securement of the fastener to the supporting panel and causing locking of the two panels together. It will be noted that wings 100 on tab 92 are adapted for engagement with the confronting panel P adjacent the fastener receiving apertures through the panels.

FIG. 11 shows an alternate method of deforming the fastener of FIG. 9 and securing it to the supporting panels P, P'. In this arrangement, both tabs 92 and 94 are deformed toward one another, thereby causing collapsing of the weaker side 98 of the fastener which has a substantial portion of the material thereof removed, and into the protruding holding position illustrated with respect to panel P', while causing some upward movement of tab 92 in attempting to pull the fastener body through the opening in the panel, as such tab pivots on wings 100, and resulting in some lengthwise movement of the tongue 90 and generally into engagement with the underside of the panel P'.

FIG. 12 illustrates another alternate method of deforming the fastener of FIG. 9, and in this arrangement, only tab 92 is deformed upwardly to the general position illustrated, such bending of tab 92 causing some movement of side 101 of the fastener toward side 98 and causing wings 100 on the tab to tend to pull the fastener body 86 up through the panel hole, resulting in deformation of the tongue 90 in the general manner illustrated. In this arrangement, since substantially all of the force on the body 86 is exerted upwardly, no collapsing of the weaker side 98 of the fastener body occurs.

From the foregoing description and accompanying drawings, it will be seen that the invention provides a deformable fastener which is adapted to be inserted through an aperture or opening in a supporting member such as for instance a panel or panels, and which is adapted to be deformed into a holding position for securely attaching two or more members together. The invention also provides a fastener which comprises a loop-like body portion and a pair of actuating tabs movable with respect to one another to cause deformation of the body portion into a locking condition on an apertured support panel.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

I claim:

1. A fastening device adapted for insertion in an opening in a support member, said device comprising,
   a generally vertically oriented loop-like body portion adapted to be received through the opening in said support member,
   a pair of tab portions extending from said body portion,
   a resilient tongue formed from the material of and disposed inwardly of said body portion, and
   said body portion having an opening adapted to receive said tongue whereby upon pivotal movement of at least one of said tab portions said tongue is caused to move through said opening and into engagement with said support member.

2. A fastening device in accordance with claim 1, wherein the free end of said tongue is normally disposed within the said opening prior to movement of said tab portion, and is thereafter by relative pivotal movement of said tab portion adapted to be movably disposed through said opening and into engagement with said support member.

3. A fastening device in accordance with claim 1, wherein said body portion is of a generally U-shaped structure, and the portion of said structure having said opening being substantially weakened as compared to the portion of said structure having said tongue portion so that the weakened portion is deformed outwardly upon pivotal movement of at least one of said tab portions.

4. A fastening device in accordance with claim 1, wherein
   said tongue is struck-out of the material of said body portion opposite said opening, and
   said struck-out portion being substantially weakened as compared to the remainder of said body portion so as to be deformed outwardly and into engagement with said support member upon pivotal movement of one of said tab portions.

5. In combination, a deformable fastening device adapted for insertion into an opening through a support member, said device including
   a generally vertically oriented loop-like body portion adapted to be received through said opening and a pair of tabs projecting upwardly from said body portion and disposed in generally spaced relation with respect to one another,
   said tabs being adapted for engagement with one side of said support member, and being adapted for relative movement with respect to one another to cause deformation of said body portion for securing the fastener to said panel,
   confronting fulcrum means on said fastener for facilitating spreading deformation of said body portion upon movement of said tabs toward one another, and
   a resilient sealing element detachably mounted on the body of said fastener, whereby said sealing element will be caused to be deformed complementary to spreading deformation of said body portion into sealing engagement with the respective side of said support member upon movement of said tabs toward one another.

6. The combination of claim 5, wherein
   the tab portions include return bent end portions to provide said fulcrum means, and
   said return bent end portions being disposed in generally confronting relationship for engagment against one another and converging toward one another in the general direction of said body portion.

7. The combination of claim 5, wherein
   said loop-like body portion is cut out adjacent the end remote from said tabs to provide a pair of deformable spaced-apart strap portions, and
   each of said strap portions having a reduced transverse width as compared to the corresponding transverse width of said loop-like body portion.

8. A fastening device adapted for insertion in an opening in a support member comprising,
   a generally vertically oriented loop-like body portion adapted to be received through the opening in a support member,
   a pair of tab portions projecting upwardly from said body portion,
   means including fulcrum areas disposed adacent the juncture of said body portion with said tab portions adapted for engagement against one another upon pivotal movement of said tab portions toward one another to cause deformation of said body portion, and
   said body portion including at least one struck-out portion to facilitate the deformation of said body portion.

9. A fastening device in accordance with claim 7, wherein said loop-like body portion includes a pair of oppositely disposed apertures extending therethrough and disposed between said tab portions and the remote end of said loop-like body portion.

10. A fastening device in accordance with claim 7, wherein said loop-like body portion is closed at the end remote from said tab portions and includes a recessed portion extending therethrough adjacent said closed end thereof.

11. A deformable fastening device adapted for insertion into an opening in a support member comprising,
   a generally vertically oriented, loop-like body portion adapted to be inserted through an opening in a support member,
   a pair of tab portions projecting upwardly and outwardly from said body portion in a direction away from one another,
   said tab portions being adapted for relative movement away from one another to cause outward deformation of said body portion for securement of said device to said support member, and
   said loop-like body portion being cut out adjacent the end remote from said tab portions to provide a pair of spaced, oppositely disposed deformable strap portions.

12. A fastening device in accordance with claim 11, wherein said strap portions each have a transverse width of a lesser dimension as compared to the corresponding transverse width of said loop-like body portion.

13. A fastening device in accordance with claim 12, wherein
said tab portions each include return bent portions,
said return bent portions being disposed generally in confronting relation with respect to one another interiorly of said loop-like portion and being spaced outwardly of the end of said loop-like body portion remote from said tab portions.

14. A fastening device in accordance with claim 11, wherein said tab portions include wing portions extending laterally outwardly from opposed sides of said loop-like body portion.

References Cited

UNITED STATES PATENTS

| | | | |
|---|---|---|---|
| 2,732,749 | 1/1956 | Pasternak | 85—5 XR |
| 2,933,791 | 4/1960 | Whyte. | |
| 2,995,789 | 8/1961 | Holton. | |

DONALD A. GRIFFIN, Primary Examiner

U.S. Cl. X.R.

85—38